United States Patent [19]

Duncan et al.

[11] Patent Number: 4,904,941

[45] Date of Patent: * Feb. 27, 1990

[54] GAUGE FOR DETECTING MISALIGNMENT

[75] Inventors: Eugene F. Duncan, Wauwatosa; Gregory L. Nadolski, Brookfield; Donald L. Van Zeeland, Franklin, all of Wis.

[73] Assignee: Eaton Corporation, Cleveland, Ohio

[*] Notice: The portion of the term of this patent subsequent to Jan. 2, 2007 has been disclaimed.

[21] Appl. No.: 137,045

[22] Filed: Dec. 23, 1987

[51] Int. Cl.⁴ .................................... G01B 7/31
[52] U.S. Cl. ........................ 324/207.18; 324/207.24
[58] Field of Search ............. 324/207, 208, 234, 239, 324/236, 228, 260, 262; 340/870.32, 686–688; 364/474.37

[56] References Cited

U.S. PATENT DOCUMENTS

| | | | |
|---|---|---|---|
| 4,422,041 | 12/1983 | Lienan | 324/208 X |
| 4,535,624 | 8/1985 | Ginns et al. | 324/208 X |
| 4,580,097 | 4/1986 | Bartlett | 324/207 X |
| 4,639,667 | 1/1987 | Andresen | 324/208 |
| 4,639,668 | 1/1987 | Petit et al. | 324/208 |
| 4,661,773 | 4/1987 | Kawakita et al. | 324/208 |
| 4,663,601 | 5/1987 | Troutmann et al. | 324/208 X |
| 4,723,503 | 2/1988 | Yuda | 324/208 X |
| 4,733,214 | 3/1988 | Andresen | 324/208 X |
| 4,796,791 | 5/1988 | Forkel | 324/208 X |

Primary Examiner—Reinhard J. Eisenzopf
Assistant Examiner—Warren S. Edmonds
Attorney, Agent, or Firm—C. H. Grace

[57] ABSTRACT

A displacement gauge or gauge for detecting misalignment (3) employs four magnetic coils (24N, etc.) 90° apart, (each) energized by an oscillator (36N, etc.), to sense the dislocation of a machine part, such as a post (12), near their center. A nominal position of the part (9 or 12) relative to a reference component (6) of the machine is first established. Subsequent displacements are detected and are indicated if they exceed a predetermined threshold magnitude.

Signals from the four coils are combined in such a way that the magnitude of the radius of a displacement of the part (9 or 12) from the nominal position is ascertained approximately, irrespective of the direction of displacement from the reference part (6). The combination signal (at 64) is the greatest of (a) the absolute value of a north/south displacement signal, (b) the absolute value of an east/west displacement signal, and (c) 0.707 multiplied by a combination signal which is the sum of the north/south and east/west absolute value signals. During setup the gauge is self-aligning on the post.

17 Claims, 8 Drawing Sheets

ANGULAR PATTERN

GAUGE FOR DETECTING MISALIGNMENT

FIELD OF THE INVENTION

The invention is in the field of position sensing devices and in particular of devices for providing an indication of displacement of one object with respect to another. For example, in a machine, if one component is intended to remain in a predetermined position with respect to a reference component, the components can be instrumented with a displacement gauge, which provides a warning signal when the first component is displaced from the intended position by more than a few thousandths of an inch.

SUMMARY OF THE INVENTION

An objective of the invention is to provide a displacement gauge capable of sensing and indicating the displacement of an object from a nominal position with respect to a reference object.

Another objective, narrower than the first, is to provide a displacement gauge that senses the displacement of an object from a predetermined nominal position, with respect to a reference object, in two dimensions, i.e., to sense the displacement within a plane.

Another objective is to sense the displacement by means which have substantially omnidirectional sensitivity.

Another objective is to sense the displacement in any direction in a plane, of an object by means of a plurality of proximity detectors disposed in a 360-degree array about the object whose displacement is to be sensed, and to process the signals of the proximity detectors in such a way as to provide an output signal whose ratio to the displacement that produced it is substantially uniform for all directions of displacement in the plane.

Another objective is to provide a displacement gauge that provides an output signal dependent upon the displacement of one object with respect to another in a plane, and an indication when the displacement exceeds a predetermined reference amount.

Another objective is to provide a displacement gauge having a self-aligning capability to facilitate setting up the apparatus.

Another objective is to provide a displacement gauge capable of implementation by an embodiment having a component post of circular cross-section or by another embodiment having a component post that has a plurality of planar sides or by other embodiments of other component shapes.

DETAILED DESCRIPTION

In order to explain the invention most clearly, a single preferred embodiment is described in detail. The described embodiment and many others that are not described are intended to be within the scope of the patent claims.

Figure 1A:
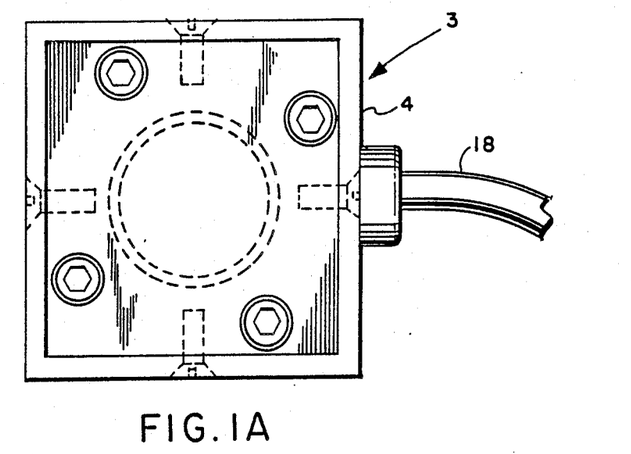
FIG. 1A is a top view of a preferred embodiment of the invention.
Figure 1B:
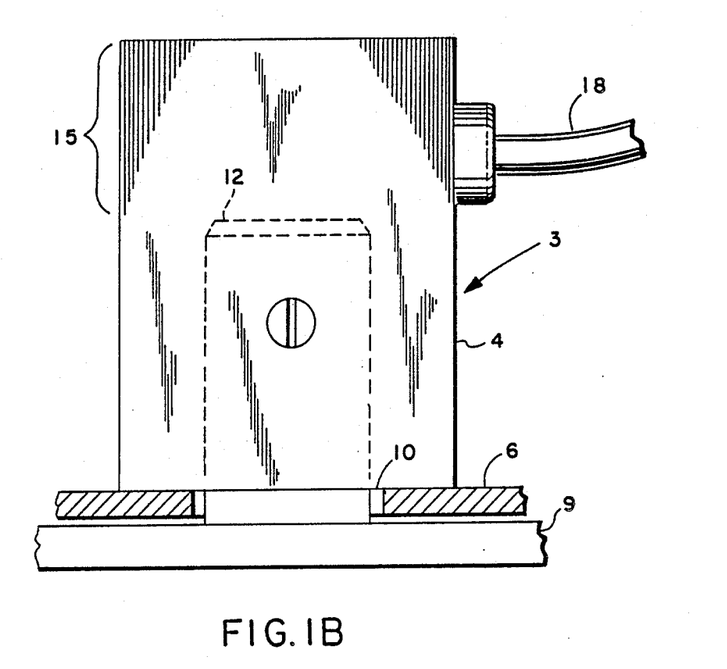
FIG. 1B is a side view of the same embodiment, with a cylindrical post shown in dotted lines.

The preferred embodiment of the displacement gauge 3 comprises a housing assembly 4 (FIG. 1A), which is mounted on a reference plate 6 (FIG. 1B).

A coupling back plate 9 is the machine component whose horizontal position is to be monitored, with respect to the reference plate 6. A post 12 is mounted on the coupling back plate 9; it protrudes through a hole 10 in the reference plate 6, as shown in FIG. 1B. A cable 18 of electric wires enters an electronic circuit compartment of the housing assembly 4, as indicated by the area 15 at the top of the housing assembly. When the coupling back plate 9 and its post 12 are displaced more than 0.003 inch in any horizontal direction with respect to the reference plate 6, the amount of misalignment and an excessive misalignment indication if appropriate are provided by the displacement gauge.

The preferred embodiment being described is for use with a turret lathe, only relevant portions of which are shown in the figures. The turret lathe has a huge rigid casting, which includes its machine bed. A rotatable work piece that is to be machined is located with reference to the machine bed.

The lathe also has a turret that has tool pockets, i.e., sockets where various cutting tools, drills, taps, etc are mounted. During operation of the lathe the turret is occasionally rotated through an angle (i.e., indexed) to bring the next tool into position to perform its function, in turn, on the revolving workpiece.

When the rotatable turret is in the correct angular position for the first one of its tools to do its work, the turret is held tightly in that angular position by a clamping mechanism, which is called a "curvic". The curvic consists of two toothed members that look like gears. A first toothed member of the curvic is on the turret. While the first tool is doing its work, the toothed members of the curvic are held tightly in engagement with each other under great force. This prevents the turret from rotating.

After the first tool has done its work, one toothed member of the curvic is withdrawn to disengage it from the other toothed member. This frees the turret, permitting it to rotate. The turret is then rotated to a second position, in which a second tool has access to the work piece. The curvic is then engaged again, by again pressing its first toothed member into forceful engagement with its second toothed member. The curvic again prevents the turret from rotating, so that the second tool can perform its machining function accurately.

It is desirable to be able to slightly adjust the locked position (i.e., the position when the curvic is engaged) of the turret with respect to the machine bed (and therefore with respect to the work piece). To enable the desired adjustment to be made, the second toothed member of the curvic is a "back plate" whose position is adjustable with respect to the machine bed. The back plate is ordinarily adjusted to a desired position and locked there. This arrangement permits some slight relocation of the turret's locked position with respect to the machine bed.

Sometimes the turret is subjected to great force during an accident or malfunction. This is referred to as a machine "crash". When a machine crash occurs a powerful force may be transmitted from the turret through the teeth of the first member of the curvic to the back plate, which is the second toothed member of the curvic.

Sometimes the back plate is bumped so hard in a crash that it is slightly displaced from its preset desired position. That dislocation would reduce the accuracy of subsequent machining operations if not corrected, and should therefore be detected and corrected before proceeding. The gauge of this invention is provided to detect when the back plate has been displaced from its desired original reference position.

FIG. 1B can be used to explain the relationship of the invented gauge to the turret lathe described above. The reference plate 6 is rigidly mounted to the machine bed; it can be thought of as the main stationary frame of reference of the entire situation. The housing 4 of the invented gauge is mounted to the reference plate 6; consequently the housing 4 can also be regarded as being in a fixed reference location.

The purpose of the invented gauge is to monitor the position of the back plate 9 with respect to the reference plate 6. The facilitate this, the post 12 is fixedly mounted on the back plate 6, so the position of the post 12 is representative of the position of the back plate 6. The post 12 therefore serves as a target whose position is to be monitored.

While a dislocating crash of the machine is occurring, the turret applies great force to the first toothed member of the curvic, which is mounted on the turret. The first toothed member transmits the crash force to the second toothed member of the curvic, which is the back plate 9. The back plate 9 (and its post 12) are moved, and don't bounce all the way back to their preset positions.

The gauge housing 4 has not moved because it is fixed to the machine bed. The displacement of the post 12 relative to the housing 4 of the invented gauge is measured by the gauge. When that displacement exceeds a predetermined limit, the invented gauge provides a signal disclosing that a dislocation of the back plate 9 has occurred.

Figure 2A:
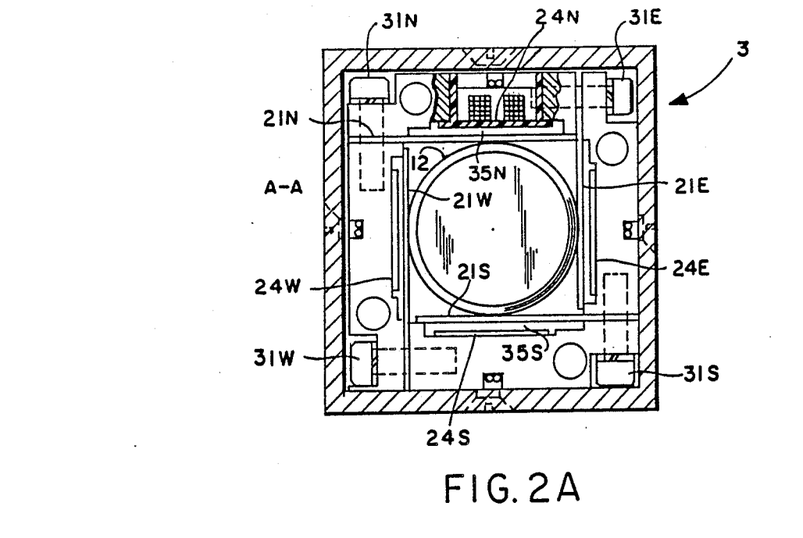
FIG. 2A is a cross-sectional view along lines A—A of the same sensor.
Figure 2B:
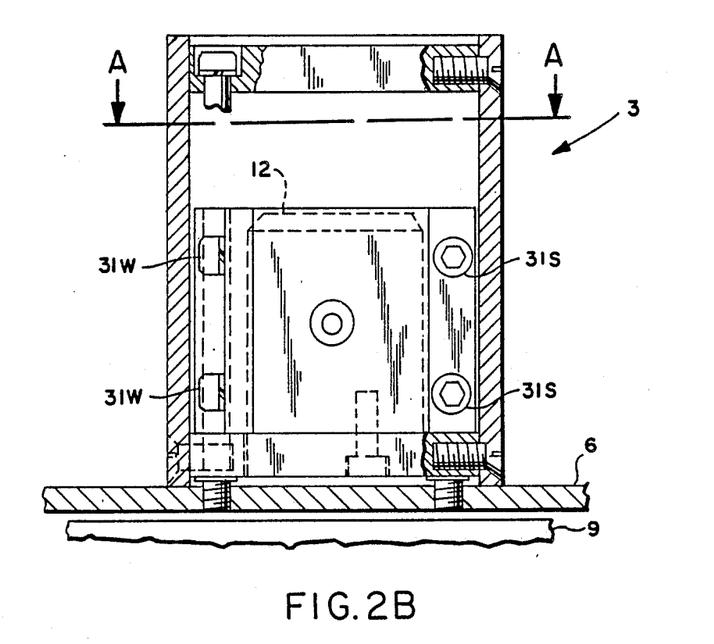
FIG. 2B is a side view showing the lines A—A.

In FIG. 2A the post 12 is shown in a centered position in the displacement gauge. During setup the housing assembly 4 and its components are free to move horizontally with respect to the reference plate 6 and the post 12. Four springs 21N, 21S, 21E and 21W, are spaced apart from each other in a square configuration having slightly smaller internal dimensions than the diameter of the post 12. The housing assembly 4 is pushed down over the post by hand pressure during setup, and all four of the springs are deflected slightly. The housing assembly 4 is then fixed in place to reference plate 6 by screws to provide approximate mechanical alignment in a nominal desired position relative to the post 12.

Figure 3A:
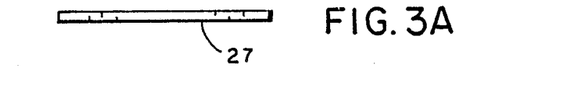
FIGS. 3A and 3B are an edge view and a plan view respectively of a flat steel spring employed in the sensor.
Figure 3B:
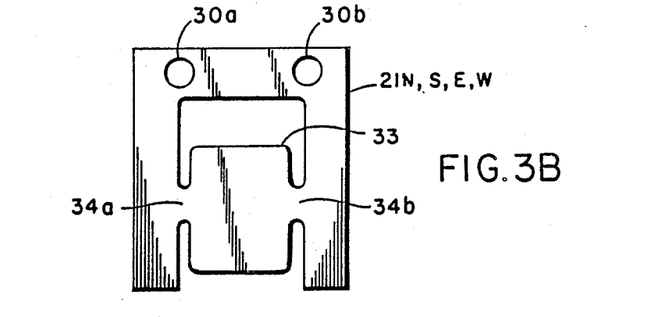

The springs 21N, 21S, 21E, 21W, are shown in FIGS. 3A and 3B. They are made from flat spring steel 0.018 inch thick and are heat treated. Each spring has two holes 30a, 30b, for mounting by means of pairs of screws 31N, 31S, 31E and 31W (FIG. 2A). As shown in FIGS. 3A and 3B an approximately rectangular target area 33 is provided on each spring, supported by two web areas 34a and 34b. The target area 33 is a portion of a magnetic circuit that produces magnetic flux eddy current losses.

Magnetic flux for the displacement sensing function is produced by magnetic coils 24N, 24S, 24E and 24W, as shown on FIG. 2A. Each coil has 110 turns of no. 35 AWG enameled wire wound over the center post of a ferrite cup core as is common practice in standard inductive proximity sensors. When the current flows in the coil 24N, magnetic flux is produced which passes through the center of the coil in a direction generally perpendicular to the plane of the coil and across an air gap 35N to the spring 21N on one side (called the north side for convenience), of the FIG. 2A.

The flux is conducted to spring 21N which completes the magnetic path back to the periphery of the coil. (FIG. 2A). Displacement of the post 12 relative to the housing 4 in a north/south direction changes the length in a north/south direction of the air gap 35N. Displacement therefore changes the reluctance of the magnetic circuit. When displacement of the post 12 is northward, the air gap 35N decreases and an air gap 35S at the other side increases. The eddy current losses of coil 24N increase and the eddy current losses of the coil 24S decrease.

In a similar manner (FIG. 2A), displacment of the post 12 along an east/west directional line increases the losses of coil 24E and decreases the losses of coil 24W. A diagonal movement of the post in for example, a northeast direction changes the losses of all four of the coils. The variations of losses of the coils are relied upon to indicate the position of the post 12.

Figures 4A, 4B:
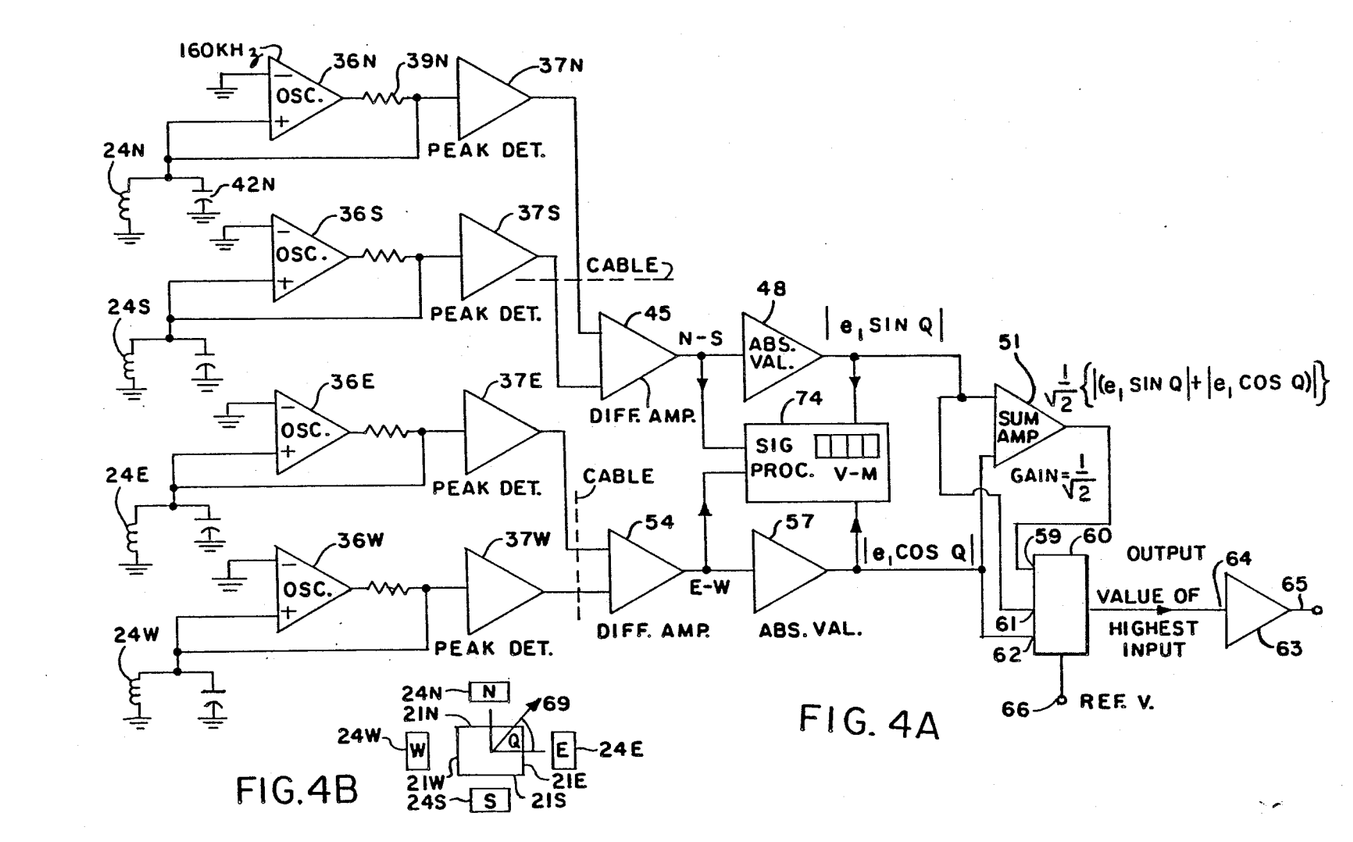
FIG. 4A is a simplified block diagram of electronic circuits of the sensor.
FIG. 4B is a stylized top view of the sensor with the angle of deflection Q defined pictorially.

Displacements of the target 33 with respect to the coils are more easily visualized with the aid of FIG. 4B. In that drawing an oblique direction 69 of displacement of a square composed of springs 21N, 21S, 21E and 21W is shown. The angle that the direction of displacement 69 forms with respect to the easterly direction is marked Q.

The simplified diagram of FIG. 4A is provided to facilitate description of the general concepts of the electronic portions of the invention. An oscillator 36N (FIG. 4A) provides an AC signal of 160 KHz to energize the proximity sensing coil 24N. The coil is driven through an output resistor 39N. The coil and a capacitor 42N form a tank circuit for the oscillator. Similar circuits are provided in oscillators 36S, 36E and 36W, for driving the other three coils.

A peak detector 37N of known and conventional design senses the peak level of the signal that it receives from the oscillator 36N (FIG. 4A). It rectifies the signal and provides a DC output to one input of a differential amplifier 45. Similar equipment 37S, 37E and 37W perform corresponding functions for the other three directional signals.

A differential amplifier 45 (FIG. 4A) receives signals at its two inputs from the peak detectors 37N and 37S, and amplifies them, to provide a signal dependent upon the north/south component of displacement of the the post 12 relative to the housing assembly 4. When the post 12 is displaced with a north/south component, from its normal center position, the differential amplifier 45 indicates both magnitude and sign of the displacement component. The difference signal is conducted from the output of amplifier 45 to the input of an absolute value circuit 48.

When the post 12 is displaced obliquely as in direction 69 of FIG. 4B, the signal at the output of amplifier 45 is proportional to the sine of the angle Q, as well as the amount of displacement. At the output of the absolute value amplifier 48, the magnitude of the north/south voltage is provided, with a positive sign. The output of amplifier 48, which is a DC signal, is connected to one input of a summing amplifier 51.

In a similar manner, a differential amplifier 54 (FIG. 4A) receives signals from peak detectors 37E and 37W, and produces a difference signal at its output. That difference signal is conducted to an absolute value amplifier 57, which makes the signal positive irrespective of the polarity of its input signal, just as in amplifier 48. In the case of the east/west channel, however, the magnitude of the signal is proportional to the cosine of the displacement's directional angle Q (FIG. 4B). The DC output of amplifier 57 is connected to a second input of the summing amplifier 51.

Continuing with FIG. 4A, amplifier 51 adds the two signals that it receives and multiples the voltage sum by 0.707. From the output of summing amplifier 51 a composite signal is conducted to a first input 59 of a comparator/OR circuit 60 (details of which are described below). A second input 61 of circuit 60 receives a signal directly from the absolute value amplifier 48, representing the north/south channel. A third input 62 of circuit 60 receives a signal directly from the output of the absolute value amplifier 57, representing the east/west component of displacement of the post 12.

Each of these three inputs is first compared with a threshold reference voltage that is applied to a terminal 66 of the circuit 60 (FIG. 4A). The reference voltage at 66 may be set, for example, at 3 volts to correspond to a displacement of the post 12 of 0.003 inch. Any of those signals that exceed the reference voltage go on to enter the OR circuit portion of circuit 60. Of the signals entering the OR circuit portion, whichever is highest controls the output signal of the circuit 60. That output signal is connected to one input 64 of an output circuit 63, where it initiates an alarm signal. The alarm signal is at a terminal 65.

To summarize, relative displacement of the post 12 produces, in general, a difference signal between coils 24N and 24S, and another difference signal between coils 24E and 24W (FIG. 4A). The absolute values of those two difference signals are added together and multiplied by a factor approximately equal to the reciprocal of the square root of 2, to produce a third signal (at 59). The third signal is employed to make the sensitivity of the displacement gauge approximately the same for diagonal displacements of the post as for displacements along the north/south and east/west axes. Of the three signals, namely north/south (at 61), east/west (at 62), and 0.707 x combined (at 59), the highest signal (at 64) represents the displacement without regard to its direction. The signals are compared with a reference threshold (at 66), which they must exceed to pass forward as a potential alarm signal. The highest of the excess signals actuates an output circuit 63.

Figure 5:
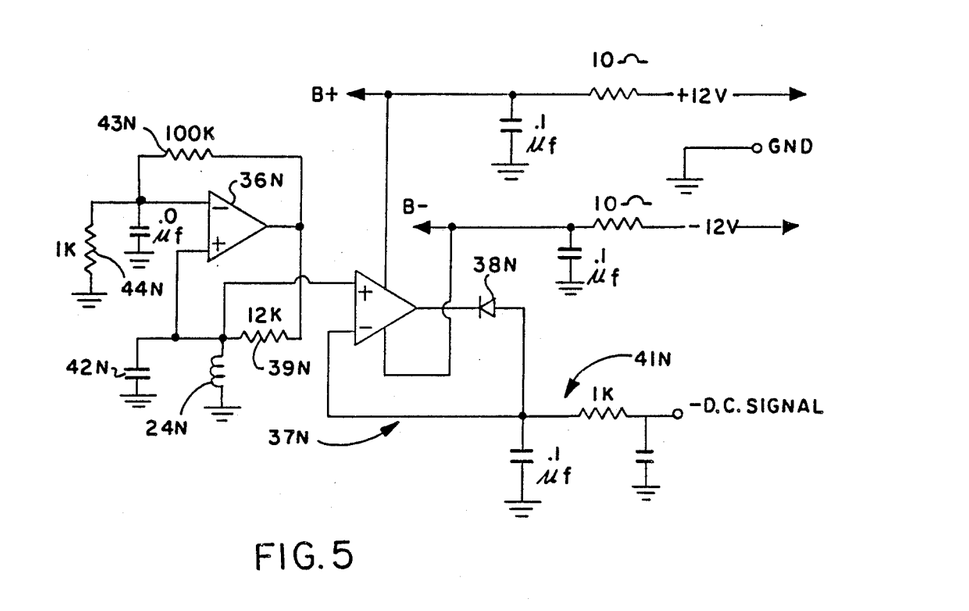
FIG. 5 is a more detailed diagram of the electronic preamplifier portion of the circuits.

In FIG. 5 details are shown of the portion of the circuit of FIG. 4A that is drawn to the left of the dotted line labeled "cable". Oscillation of the oscillator 36N is established by positive feedback through a resistor 39N to the tank circuit. The peak detector 37N is generally indicated on FIG. 5. Only negative output signals are supported because positive signals are blocked by a series output diode 38N. The negative peak output signal is filtered by a pi section resistance/capacitance filter 41N.

Figure 6:
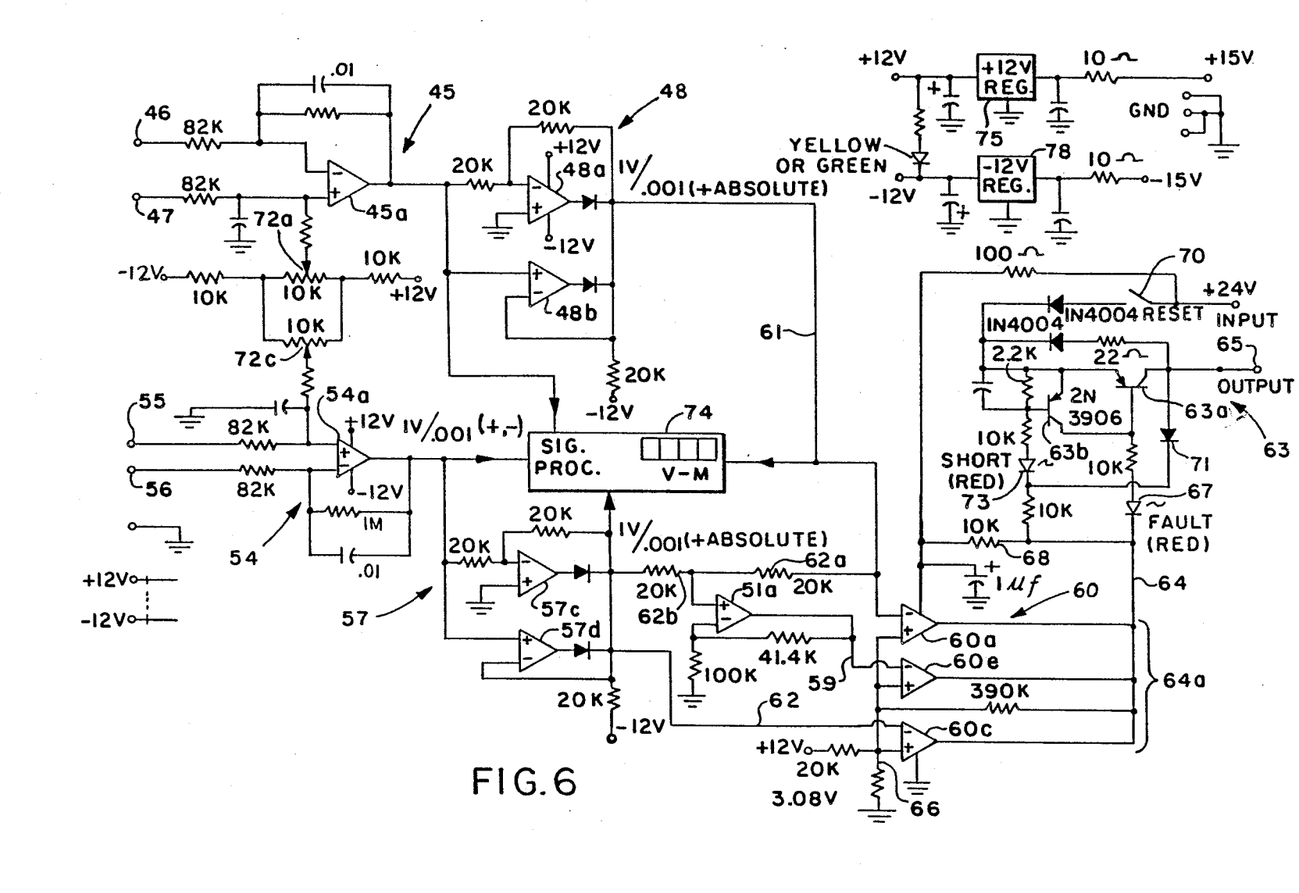
FIG. 6 is a more detailed diagram showing other portions of the electronic circuit.

In FIG. 6 details of other subcircuit of FIG. 4A are provided. For the reader's convenience the amplifier itself of the differential amplifier circuit 45 (FIG. 4A) is denoted by a reference symbol 45a on FIG. 6. The whole circuit 45 includes resistors and capacitors external to the amplifier 45a. Other amplifiers are similarly referenced.

External resistors and capacitors associated with amplifier 45a are conventional and well known for amplifiers of this type (FIG. 6). A potentiometer 72a forms a portion of a voltage divider between a regulated positive 12 volt power supply and a regulated negative 12 volt power supply. The movable arm of potentiometer 72a is adjusted during setup of the apparatus to null the north/south output signal when the post 12 is in the nominal center position. Potentiometer 72a, therefore, provides a fine adjustment of the approximate mechanical self-alignment that is produced by the preloading pressures of the north/south springs 21n and 21s.

Terminals 46 and 47 (FIG. 6) are connected to the coils 24N and 24S (FIG. 4B), respectively (FIG. 6). They conduct signals through 82 k ohm resistors to the inverting and non-inverting inputs respectively of the amplifier 45a (FIG. 6). Negative feedback is provided by a 0.01 microfarad capacitor in parallel with a 1 megohm resistor connected from the output of amplifier 45a to its inverting input.

The output of amplifier 45a is also connected to a non-inverting input of an amplifier 48b and through a resistor to the inverting input of another amplifier 48a. Both of the latter amplifiers have diodes in series with their outputs (FIG. 6). A feedback resistor is connected from the connection of the cathode outputs of those diodes to the inverting input of amplifier 48a. Amplifier 48b has negative feedback without a resistor. This arrangement provides full wave rectification of the signal received from amplifier 45a.

The output of amplifiers 48a and 48b (at 61) is a positive absolute value of the input signal (FIG. 6). That positive DC output is connected to an inverting input (61) of an amplifier 60a (FIG. 6, which is a part of circuit 60 of FIG. 4A). The non-inverting input of amplifier 60a has applied to it a reference threshold voltage at a terminal 66 (FIG. 6). The output of amplifier 60a is the excess of signal voltage its signal voltage at 61 over the reference threshold voltage at 66. However, it provides only one input of a wired-OR circuit 64a whose other inputs come from amplifiers 60e and 60c (FIG. 6).

In a very similar manner, the signals from coils 24E and 24W (FIG. 4A) are connected to terminals 55 and 56 (FIG. 6), and pass through resistors to noninverting and inverting input terminals, respectively, of an amplifier 54a (FIG. 6). The noninverting terminal of 54a receives an additive input signal from a potentiometer 72c whose outside legs have positive and negative DC supply voltages and whose transfer arm can be adjusted to null the east/west signal.

The output of amplifier 54a is connected to amplifiers 57c and 57d, whose circuits are the same as those of amplifiers 48a and 48b (FIG. 6). They extract the positive absolute value of the DC signal at their input. That absolute value is conducted to an inverting input terminal 62 of amplifier 60c whose output must exceed the reference voltage at terminal 66 if it is to join other outputs in the wired-OR circuit 61 64a, as described above.

The use of absolute values is permissible in the circuit portion being described because the final signal from this portion need indicate only the absolute value of the displacement of the post 12, irrespective of the direction of the displacement. A northward displacement of 0.003 inch actuates a go/no-go indicator of misalignment connected to terminal 65, and a southward displacement of 0.003 inch actuates the same indicator (FIG. 6).

From the output of the absolute value circuit 48 (i.e. amplifiers 48A and 48B), an additional connection is made through a 20 k ohm resistor 62a to the noninverting input of an amplifier 51a, FIG. 6. In the same way an output from the absolute value circuit 57 is connected through a 20 k ohm resistor 62b to that same non-inverting input. The amplifier 51a has a gain of 0.707; its gain is stabilized by feeding back a signal from its output through a 41.4 k ohm resistor to the inverting input terminal of the amplifier. A 100 k ohm resistor is also connected to that inverting input terminal and its other end is connected to ground; the ratio of resistors provides the proper gain for the amplifier in the usual manner.

The output of amplifier 51a at terminal 59 is connected to an inverting input (at 66) of an amplifier 60e whose non-inverting input has the same threshold reference voltage as amplifiers 60a and 60c (FIG. 6). The output of amplifier 60e in excess of the reference voltage component joins the wired-OR circuit 64A. Circuit 64A, therefore, has as inputs the excess portion of three input signals representing the north/south coils, the east/west coils, and a weighted composite of those two signals.

The greatest of the three signals is output from the wired-OR circuit through terminal 64 to the comparator circuit 63 (FIG. 4A, and shown in more detail on FIG. 6 as transistors 63a, 63b, etc.). The signal at terminal 64 is of negative polarity. When a signal appears there, a transistor 63a starts conduction at its collector electrode, to provide current at the alarm output terminal 65. Thus, when the predetermined threshold level is exceeded, the voltage at terminal 64 goes low and a misalignment is indicated.

The output stage 63 is protected against short-circuited loads by a diode 71 and a protective transistor 63b (FIG. 6). The diode 71 conducts current from the output of transistor 63a when the output is high, to a base circuit that biases the transistor 63b to cutoff. When the load on terminal 65 is short-circuited, the transistor 63b conducts. Its collector-emitter circuit is connected from the emitter of transistor 63a to the base of transistor 63a, to prevent conduction of transistor 63a. A short circuit is indicated by a light emitting diode 73. Following overload, the safety circuit can be restored by means of a reset switch 70, as shown in FIG. 6.

Analog and/or digital outputs representing the amount and direction of displacement of the post are indicated by a circuit 74 (FIGS. 4A and 6). The output of circuit 74 is a visual indicator, such as a voltmeter display. If digital output is desired as is preferable, the circuit 74 is a digital voltmeter, and if analog it is an analog voltmeter. It is switchable to measure the value (including sign if desired of the north/south signal at the output of amplifier 45, or the value (including sign if desired of the east/west signal at the output of amplifier 54. Of course the circuit 74 can be a more capable signal processing output device if desired, for example it could present the displacement information in polar coordinate form. The direction Q of displacement is the angle whose tangent is the quotient of the north/south signal over the east/west signal.

A power supply regulator of conventional type is provided as shown on FIG. 6. It has a positive 12-volt regulator 75 and a negative 12-volt regulator 78, with filtering and indicating elements of well-known design.

Figure 7:
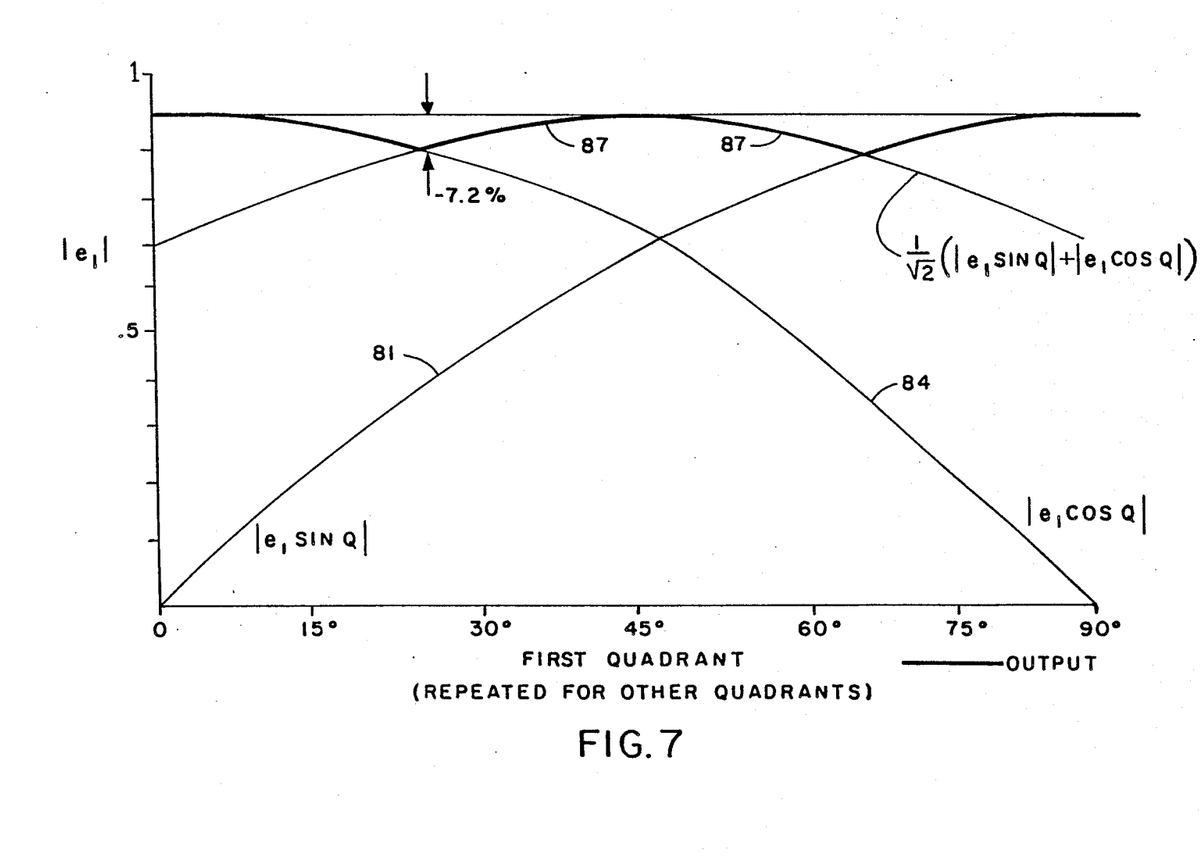
FIG. 7 is a rectangular coordinate graph of the output signal resulting from a uniform magnitude of displacement of the measured object with respect to the reference object as a function of the direction of displacement.

FIG. 7 shows a graph 81 of signal voltage, which is the absolute value of a signal in the north/south channel, as at the output of amplifier 48. Curve 84 is the absolute value of a signal in the east/west channel, as at the output of amplifier 57. The curve 87 is the composite signal at the output of amplifier 51a. FIG. 7 shows that the approximate method that is employed for treating oblique displacements results in an error of only minus 7.2 percent, which by change of gain of an amplifier could be made plus or minus 3.6 percent.

Figure 8:
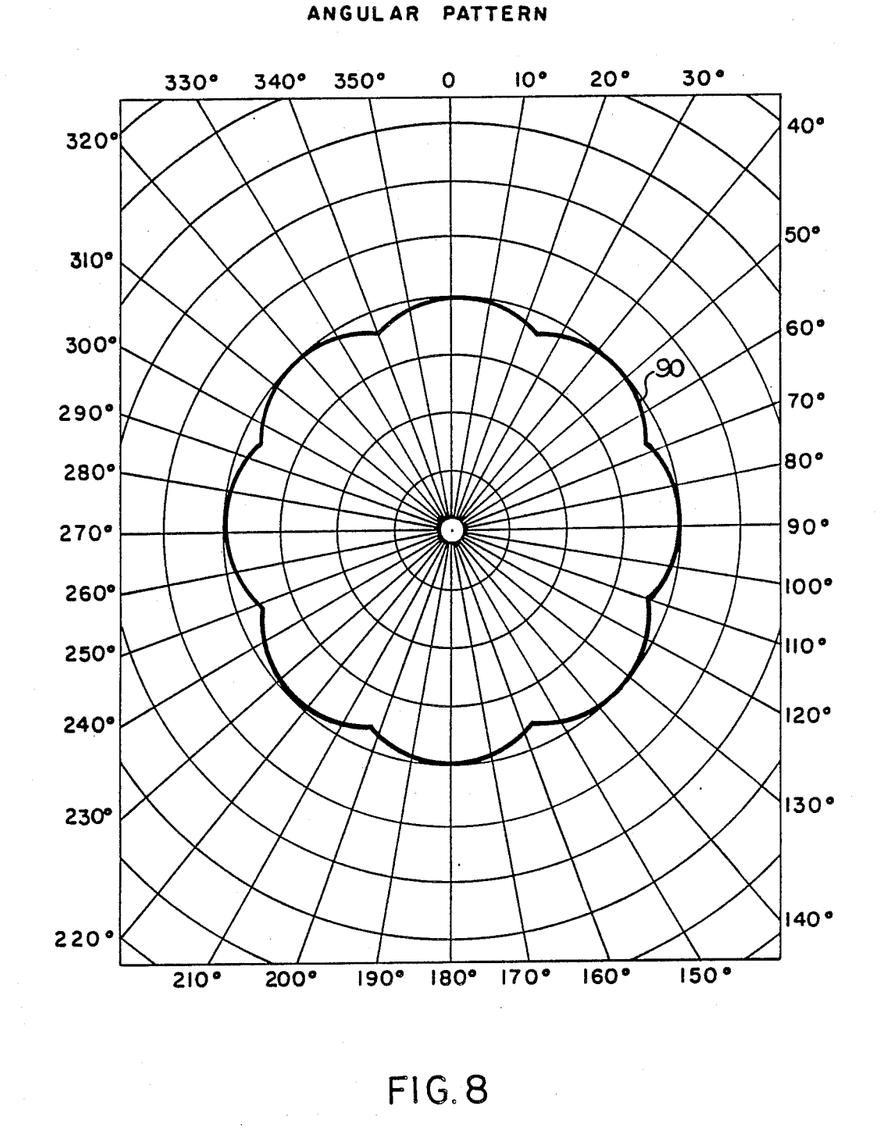
FIG. 8 is a polar coordinate graph of the sensitivity of the displacement gauge as a function of direction of displacement, illustrating its substantially circular response pattern.

FIG. 8 shows a curve 90, which is the directional sensitivity pattern of displacement of the post 12. It is seen to be nearly circular in the horizontal plane.

Figure 9A:
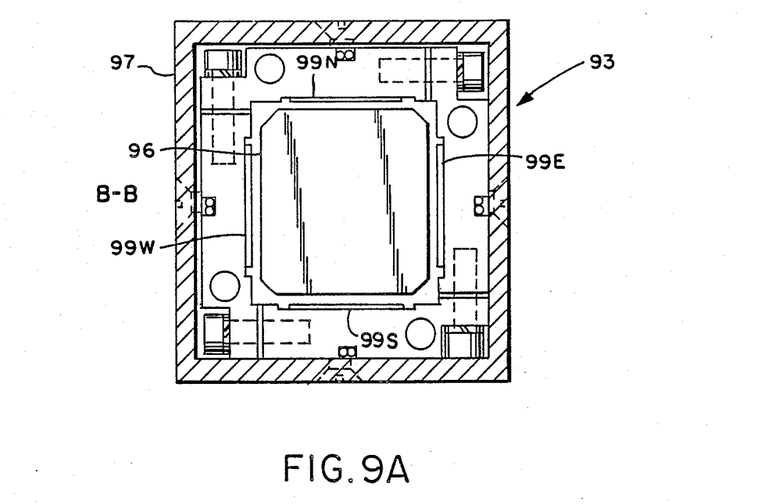
FIGS. 9A and 9B are top and side sectional views respectively of a second embodiment of the invention, in which the post has a substantially square cross-section.
Figure 9B:
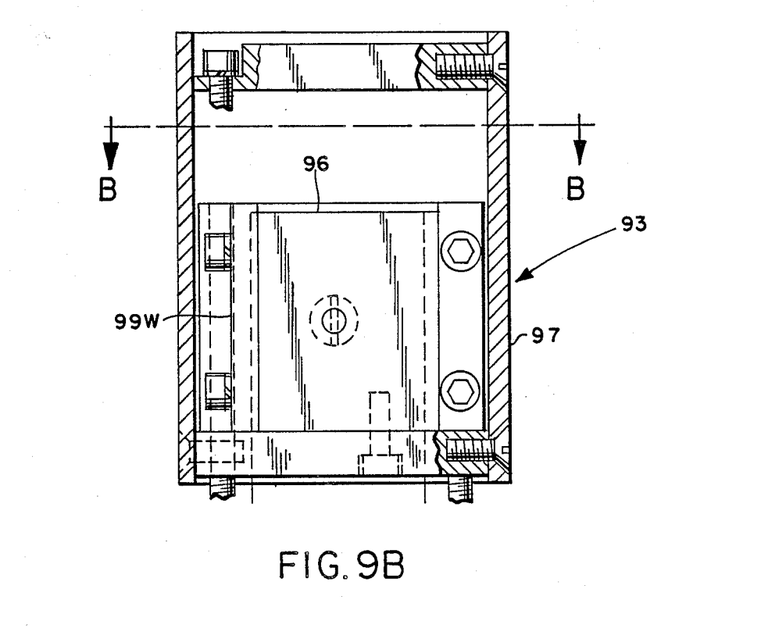

In FIG. 9A an alternative embodiment of the invention is shown in which the post 12 is supplanted by a substantially square post 96. This change permits elimination of the springs 21N, 21S, 21E and 21W. Other means, whose descriptions are omitted, are then employed for roughly mechanically centering the displacement gauge's housing 97 over the post 96. The proximity-sensing magnetic coils for the embodiment of FIGS. 9A and 9B are 99N, 99S, 99E and 99W.

A disclosure of a specific embodiment is made in sufficient detail to enable others to practice the invention. Numerous variations are possible which, as usual, are omitted from the description but which are intended to be covered by the claims. For example, although round and square posts 12 and 96 affixed to a movable part of the machine are described, they could be replaced be a portion of the machine itself that is provided primarily for other purposes.

Moreover, the protuberance 12 (post of FIG. 1B), 96 (post of FIGS. 9A and 9B), the targets 33 (FIG. 3B), etc. whose positions are to be sensed can be shaped for optimum performance of the displacement gauge. If desired, the output signal can be made very linear by shaping the post, and/or the targets 33 and/or, the coils 24N etc. Alternatively, the output signal from each coil can be made non-linear by such shaping, if desired, for better results upon combination of the signals.

What is claimed is:

1. A displacement gauge (3) comprising:
an object (12) whose displacement is to be sensed;
sensor means (21N, 24N, 27, etc.) positioned near said object and responsive to the position of said object relative to said sensor means, for sensing displacement of said object;

said sensor means comprising a plurality of N transducer means (24N, etc.) positioned at spaced-apart directions from said object, each for providing a first signal (N-S from 45; E-W from 54) dependent upon the component vector of the object's displacement along a respective directional line;

first processing means (48, 57) receiving said first signals for converting said first signals to respective signals magnitude signals (at 61, 62) representative of their magnitudes irrespective of the sign (north or south; east or west) of said respective component vector of displacement;

means (51) receiving said magnitude signals for algebraically adding at least two of said magnitude signals in sums of at least two signals, and for weighting each by a predetermined factor for providing at least one composite signal (at 59);

second processing means (60) for displacement-signal processing comprising a logic OR-function devide (64a) receiving said composite signal (at 59) and said individual magnitude signals (at 61, 62), for selecting the greatest of them as an indication of the magnitude of displacement of said object (12);

whereby said sensor means (21N, etc.) senses the relative displacement of said object (12) with substantially equal sensitivity irrespective of its the object's direction of displacement.

2. A displacement gauge as in claim 1 and wherein said transducer means further comprises at least one pair of transducers positioned in directions 180° apart, and said first processing means further comprises means for algebraically subtracting said first signal of one transducer from said first signal of the other transducer of its pair before the absolute value is obtained.

3. A displacement gauge as in claim 1 and wherein said directions of said transducer means are spaced apart 360/N degrees.

4. A displacement gauge as in claim 1 and wherein N=4.

5. A displacement gauge as in claim 1 and wherein said transducer means further comprises magnetic coil means.

6. A displacement gauge as in claim 5 and further comprising means for exciting said magnetic coil means by an AC component of current.

7. A displacement gauge as in claim 1 and wherein said transducer means comprise proximity transducer means.

8. A displacement gauge as in claim 7 and wherein said proximity transducer means comprise magnetic proximity transducer means.

9. A displacement gauge as in claim 8 and wherein said magnetic proximity transducer means comprises oscillator means having a coil which is part of an oscillator for energizing the coil.

10. A displacement gauge (3) comprising:
an object (12) whose displacement is to be sensed;
sensor means (21N, 24N, 27, etc) positioned near said object and responsive to the position of said object relative to said sensor means, for sensing displacement of said object;
said sensor means comprising a plurality of N transducer means (24N, etc.) positioned at spaced-apart directions from said object, each for providing a first signal (N-S from 45; E-W from 54) dependent upon the component vector of the object's displacement along a respective directional line;
third processing means (74) for providing displacement data including means for providing data output adequate to convey information as to both magnitude and direction of displacement.

11. A displacement gauge as in claim 10 and wherein said directions of said transducer means are spaced apart 360/N degrees.

12. A displacement gauge as in claim 10 and wherein N=4.

13. A displacement gauge as in claim 10 and wherein said transducer means (24N, etc.) further comprises magnetic coil means.

14. A displacement gauge as in claim 13 and further comprising means (36N, etc.) for exciting said magnetic coil means by an AC component of current.

15. A displacement gauge as in claim 10 and wherein said transducer means (36N, etc.) comprise proximity transducer means.

16. A displacement gauge as in claim 15 and wherein said proximity transducer means comprise magnetic proximity transducer means (36N, etc.).

17. A displacement gauge as in claim 16 and wherein said magnetic proximity transducer means comprises oscillator means (36N) having a coil (24N) which is part of an oscillator for energizing the coil.

* * * * *